Oct. 8, 1957 P. J. CHENERY 2,808,999
AUTOMATIC FLIGHT CONTROL APPARATUS
Filed May 7, 1949 3 Sheets-Sheet 2

INVENTOR
PETER J. CHENERY
BY
Herbert C. Thompson
his ATTORNEY.

Oct. 8, 1957

P. J. CHENERY 2,808,999

AUTOMATIC FLIGHT CONTROL APPARATUS

Filed May 7, 1949

INVENTOR
PETER J. CHENERY
BY
Herbert N. Thompson
his ATTORNEY.

United States Patent Office 2,808,999
Patented Oct. 8, 1957

2,808,999
AUTOMATIC FLIGHT CONTROL APPARATUS

Peter J. Chenery, Pelham, N. Y., assignor to Sperry Rand Corporation, a corporation of Delaware Application May 7, 1949, Serial No. 91,913

28 Claims. (Cl. 244—77)

This invention relates to automatic control of aircraft and particularly concerns an automatic pilot providing a greatly simplified system whereby altitude and automatic approach control terms may be employed.

In automatic pilots known to the art, it is normal to produce control moments that are primarily responsive to displacement signals, such as would be obtained from linear pickoffs on directional or attitude reference devices or the like. These devices have been developed to have great accuracy and include means for differentiating displacement signals to thereby provide control terms of higher derivatives in addition to the first order displacement term. One object of the present invention is to obtain such higher derivatives of displacement signals by means independent of the source of the displacement signal, so that vagaries in the latter due to any cause, such as loose coupling between the master instrument producing such signal and the aircraft will be avoided; and at the same time the complication of additional gyroscopic instruments also avoided.

In the automatic pilot of the present invention, control terms are obtained from instrumentalities directly responsive to the higher order of craft movements, such as rate of change of yaw and other accelerations, and these signals are then integrated to obtain rates and amounts of turn for use as control terms in the automatic pilot and to enable their convenient monitoring by displacement devices. This approach to automatic flight control greatly simplifies the problem of introducing control terms into the system from such devices as altitude control, automatic navigation or airport approach functions.

Therefore, it is a primary feature of the present invention to provide acceleration responsive reference devices for producing the primary control terms of an automatic pilot together with integrating means for establishing rate and displacement terms which in turn may be monitored by standard reference equipment.

Another feature is in the provision, in an automatic pilot, of means whereby automatic navigation and approach functions may be entered in a simple manner. A further feature of the present invention resides in the provision of an automatic pilot capable of automatically executing maneuvers that include 60 or 70 degrees of bank, since present automatic pilots using a gimbaled gyroscope or other gimbaled reference give somewhat erroneous readings and hence produce erroneous signals when the airplane is banked at 60 or 70 degrees or more during a turn, because of the well-known gimbal errors. My invention also provides heading selection means whereby a desired heading may be preset and the craft will automatically enter into the heading desired and continue to proceed on that heading.

A further feature of the present invention is in the application of a limited error heading signal to the ailerons. A further feature is in the use of first and second integrals of yaw accelerations for rudder or directional control, and a still further feature is in using transient command signals for turn entry and recovery.

These and other features will become more easily discernible by reference to the drawings wherein.

Figure 1:
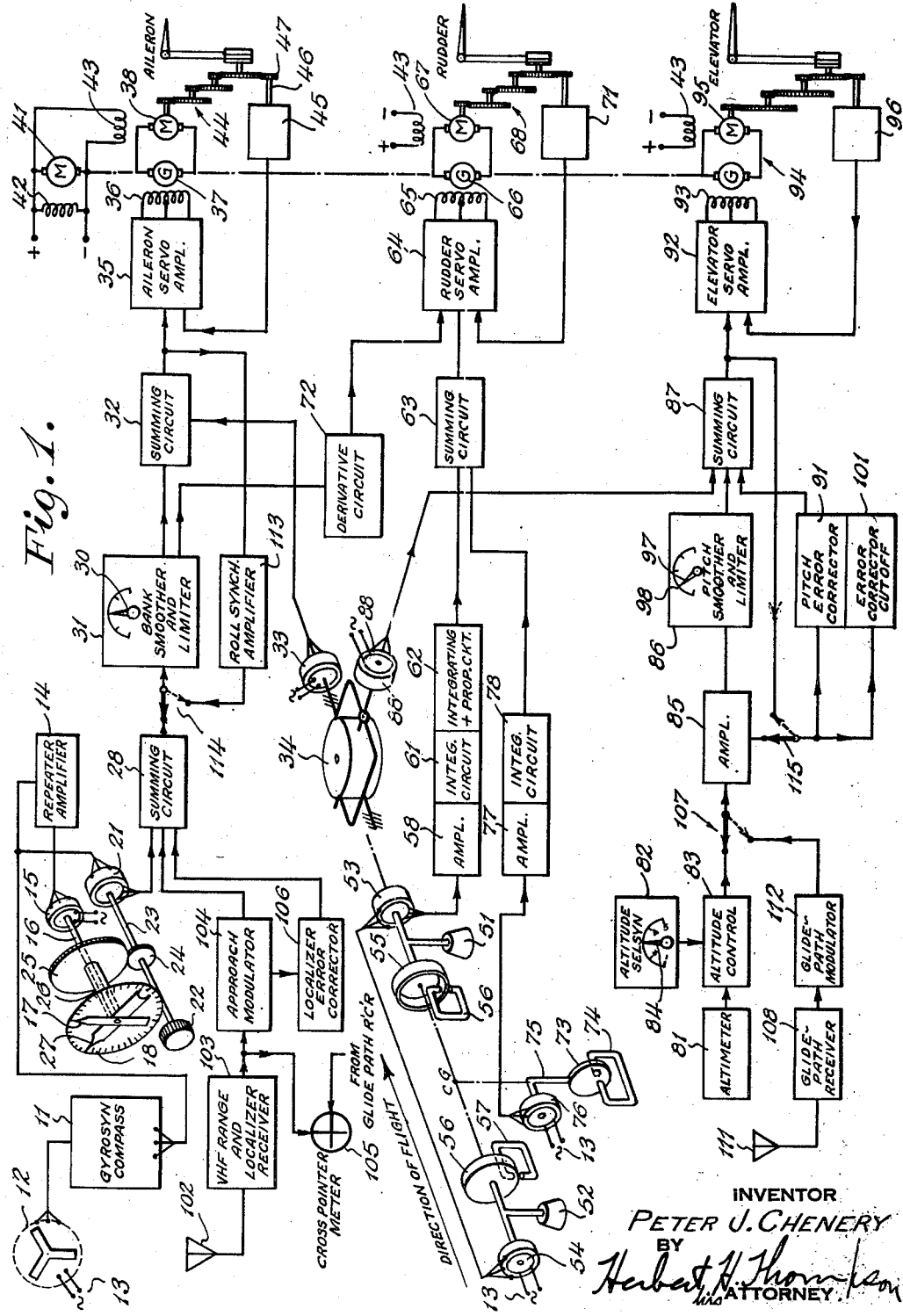
Fig. 1 is a schematic drawing, partly in perspective, of the apparatus of the present invention.

Referring now to Fig. 1, heading information may be obtained from a Gyrosyn compass 11 which is equipped with a flux valve 12 energized from an A.-C. source of potential 13. Further details of the Gyrosyn compass are shown in the patent to Esval et al. No. 2,383,461, dated August 28, 1945, and entitled Flux Valve Compass Systems.

This heading information from the Gyrosyn compass 11, in the form of signal voltages, is transmitted to a repeater amplifier 14 wherein it is amplified and is then transmitted to the stator of a selsyn 15. The rotor of the selsyn 15 is energized from the A.-C. source 13 and, by virtue of a shaft 16 that interconnects the rotor of the selsyn 15 with a pointer 17, the craft's heading may be determined by reading the position of the pointer on the compass card 18. The craft heading signal is also transmitted to the stator of selsyn 21. The rotor of selsyn 21 is positionable by the turn control knob 22 acting through the shaft 23. Gear member 24, arranged to rotate with shaft 23, and gear member 25, arranged to rotate with the shaft 26, which is concentric with and surrounding shaft 16, are meshed so that when the turn control knob 22 is positioned in accordance with present craft heading, the signal output from the selsyn 21 will be zero, and a second pointer 27 positioned by the shaft 26 will coincide with the craft heading indication pointer 17. When the turn control knob 22 and with it, the pointer 27, is turned to a position disagreeing with the position of present craft heading as indicated by the pointer 17, the pointer 27 will be displaced from the pointer 17 and accordingly, a signal will be generated in the selsyn 21 that is proportional to that displacement. Thusly, in the event that the airplane's heading and the desired heading, as determined by the setting of a turn control knob 22, are not the same, the error voltage from the rotor of selsyn 21 will be transmitted to the summing circuit 28, more fully described hereinafter with reference to Fig. 4, wherein other signal voltages also to be described hereinafter, may be added to the voltage described and then transmitted to a bank smoother and limiter 31. This bank limiter to be more fully described hereinafter with reference to Fig. 3, has a smoothed output that is proportional to its input up to a selected level as set in by the knob 30. For inputs greater than that required to produce the selected maximum output, the output remains constant at the selected maximum level. For example, the maximum bank angle may be set in by the knob 30 to any desired value, such as 15, or 20, or 45 degrees, etc. Also, the maximum rate of change of the signal voltage output from the bank limiter is limited by an internal resistance-capacitance integral network. The output from the bank signal smoother and limiter 31 is then transmitted to a summing circuit 32, where a roll signal proportional to the actual roll of the craft is supplied from a roll selsyn 33 which is responsive to motion of the craft about its longitudinal axis, the rotor of the selsyn 33 being connected to be displaced by relative motion between the vertical gyro 34 and the craft. This roll signal, after being combined with the output from the bank limiter circuit is then differentiated within the summing circuit 32 by an appropriate network. The original roll signal and its derivative are combined and further amplified in the aileron servo amplifier 35, whose output is connected to excite the field 36 of servo control generator 37 and, through a conventional Ward-Leonard motor-generator arrangement, serves to operate an aileron servo motor 38 to deflect the ailerons. The Ward-Leonard servo motor arrangement includes a motor 41 which drives the generator 37 (and also generators 66 and 94) and having a field winding 42 excited from a D.-C. source, as is the field winding 43 of motor 38. The aileron control surface is then displaced by action of the aileron servo motor 38 through the gear train 44. A repeat back signal that is responsive to displacement of the ailerons is generated within the signal generator 45 which is operatively associated with the gear train 44 through the shaft 46 and gear 47, and this signal is fed back to the aileron servo amplifier 35 as an input, thereby enabling the system to produce a control surface deflection that is proportional to the aileron servo amplifier input signal.

Figure 2:
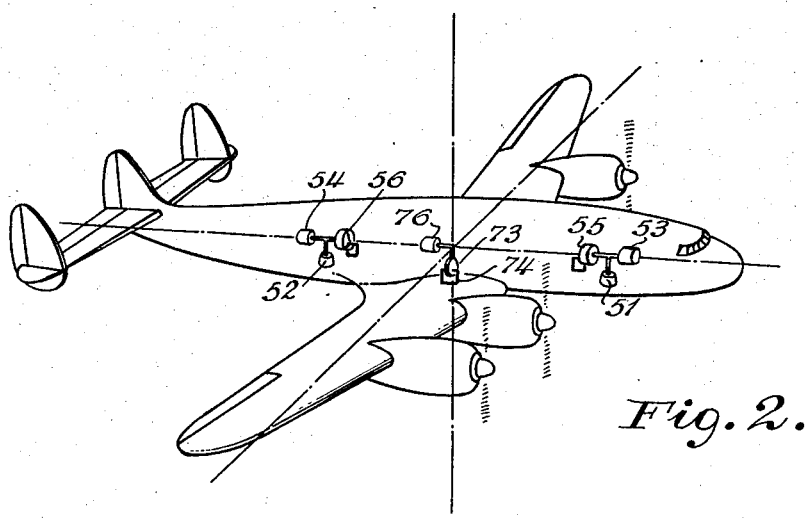
Fig. 2 illustrates the preferred location of the accelerometers, illustrated in Fig. 1, in a craft.

Turn coordination to maintain side force and side slip equal to zero, and short period yaw stabilization in both straight and turning flight are provided by a combination of three signals that are applied to control the rudder of the craft. One signal may be obtained from a system employing a pair of accelerometers, one accelerometer 51 being mounted forward of the airplane's center of gravity such as in the nose of the craft as shown in Fig. 2, and the other accelerometer 52 mounted at a different fore and aft distance from the center of gravity of the craft in which positions the linear or inertial acceleration force acting upon it during angular acceleration in one direction would be different from such inertial force acting on the other mass. Therefore, the two pendulums would be deflected through a different angular distance. The maximum difference is, of course, obtained where one pendulum is mounted in the nose well forward of the center of gravity and the other pendulum in the tail well aft of the center of gravity which is the position shown in Fig. 1. This pair of accelerometers are employed to measure angular acceleration of the airplane about its yaw axis, or in other words the rate of change of the rate at which the craft is yawing. It should be noted that this device measures the rate of change of yaw about the craft's own yaw axis as distinct from the true vertical axis. It is, therefore, not affected by banking of the craft and on this account is greatly superior to devices which depend upon a directional gyroscope or magnetic compass as a baseline for determining rate of yaw. This may be readily appreciated if one considers the craft as steeply banked, for example a 75° bank. In this case any reference which maintains its vertical position on the craft will give erroneous signals since under such conditions, although the craft may be turning about its own yaw axis at a uniform rate, the signals from the directional gyroscope will be variable and incorrect due to gimbal errors which become prohibitive as the bank angle approaches 90°. Although accelerometers of the linear type are employed, the location of each accelerometer relative to the craft's center of gravity and the connections used, provide an output signal that is responsive to rotational acceleration only, i. e., change in the rate of yaw. In the event that translational, lateral acceleration (side slip) of the craft occurs, the output signal will not be affected thereby, because the deflection of the pendulums 51 and 52 will be in the same direction and the selsyns 53, 54 are connected so that a signal is produced only upon a difference in the position of said pendulums with respect to their stators, as hereinafter explained. Of course, changes in speed of the craft will likewise not affect the signal because the pendulums are mounted for laterally swinging only. Each of the accelerometers 51 and 52 is provided with a selsyn. Selsyn 53 is arranged to have its rotor positioned in response to rotation of accelerometer 51 around the longitudinal axis of the craft and its stator is secured to the craft itself and is electrically connected to the stator of selsyn 54 which has its stator positioned in rotation by motion of the aft accelerometer 52 about the craft's longitudinal axis. The rotor of selsyn 54 is energized from an A.-C. source 13. By appropriately arranging the windings interconnecting the stators of selsyns 53 and 54, an output signal from the rotor of selsyn 53 can only be obtained when the accelerometers 51 and 52 swing away from their normally vertical positions through different angles of inclination about the longitudinal axis of the craft. When they rotate in the same direction and to the same extent about said axis due to equal acceleration force on each of the accelerometers, such as would occur if the craft were to simply side slip, the two stator windings will be in electrical agreement with the rotor winding of selsyn 53 and accordingly, the output signal from selsyn 53 will be zero. Also, turns of the craft will not generate any signal by the selsyns 53, 54, because if the turn is correctly banked the pendulums will remain perpendicular to the floor of the craft and therefore their position with respect to their stators or selsyns 53, 54 will remain unchanged. Furthermore, even if the turn was incorrectly banked, no signal would be produced because the pendulums would be displaced by an equal amount and hence no signal would be produced. Since the center of a turn is usually far away from the craft, the difference in inclination of the two pendulums becomes inconsequential.

In order to avoid short duration spurious displacements of the accelerometers 51 and 52, damping means are provided for each accelerometer and may take the form of open ended cylindrical copper cups 55 and 56 rotatable about the longitudinal axis in accordance with rotation of each of the accelerometers 51 and 52, and each having an eddy current brake in the form of permanent magnets 56 and 57 respectively. Rotation of the copper cups in the magnetic field of the magnets generates eddy currents which provide a braking effect proportional to the velocity of the disturbance.

The net yaw angular acceleration signal emanating from the selsyns 53 and 54 is transmitted to an amplifier 58 through an integrating circuit 61 to give a signal proportional to the rate of yaw, and through a second integrating circuit 62 wherein a signal proportional to yaw displacement (total change in heading) is obtained, and these signals are for a period that is short compared to the time constants of the integral circuits. That is, these signals rapidly decay with time, i. e. are proportional to the rate of yaw and yaw displacement for time periods that are short compared to the time constants of the integrator circuits, and after a period in excess of the time constants of these circuits the yaw rate and displacement signal derived from a particular angular acceleration transient will disappear. These computed yaw, and rate of yaw signals, are then transmitted to a summing circuit 63 whereupon they serve as an input to the rudder servo amplifier 64. Upon amplification within the rudder servo amplifier the signal is then applied to the servo control generator field 65 and upon exciting the generator 66 (which has its armature mechanically secured to the motor 41, described with reference to the aileron control circuit), a current will be generated in the armature winding which will cause the rudder servo motor 67 to displace the rudder through the gear train 68. Upon operation of the rudder in response to the signal described, yaw and rate of yaw will be maintained equal to zero. A rudder servo displacement signal is generated in the signal generating device 71 and is fed back as an input to the servo amplifier 64 to make rudder deflection proportional to the servo amplifier input signal.

The short period yaw stabilizing signal just described resists any attempt to enter into a turning condition from a straight flight. It hence may be used to supplement direct manual control of the craft without an automatic pilot. When used with an automatic pilot, this tendency must be overcome and to overcome this tendency and to compensate for any adverse yaw, that is, yaw in a direction opposite to the desired turn, due to unequal drag force when the ailerons are deflected, a signal is provided that is proportional to the rate of the roll command. This signal is obtained by differentiating, with respect to time, the output from the bank smoother and limiter 31 in the derivative circuit 72. It hence is a transient or decaying signal which exists only as long as the signal output of the bank integrator is changing and disappears when this signal is either constant as in a steady turn or zero as in straight flight. The output from this derivative circuit 72 is then applied to the rudder servo amplifier 64 and comprises the second yaw control signal.

The third yaw control signal is obtained from a lateral accelerometer or side slip pendulum 73, which is pivoted at the fore and aft center of gravity of the craft and is equipped with an eddy current damping device 74 similar to the damping devices secured to the accelerometers 51 and 52. Secured to the pivot shaft of the pendulum arm 75 is a selsyn 76 having its rotor excited from an A.-C. source 13. This rotor is positioned in rotation upon movement of the pendulum 73 laterally with respect to the craft. The output from the selsyn 76 is proportional to the angle between the virtual vertical as determined by the pendulum (i. e., the resultant gravity-acceleration vector) and the vertical plane of symmetry of the airplane. In other words, no signal is produced by selsyn 76 either in straight flight or correctly banked turns, since under the latter condition the pendulum remains perpendicular to the floor of the craft and therefore there is no displacement between the rotor and stator of the selsyn. If turning with side slip is occurring, however, a signal is transmitted to an amplifier 77, integrated in the integrator circuit 78 and summed with the angular yaw responsive signal earlier described herein in the summing circuit 63 and then applied to the input of the rudder servo amplifier 64. This last-identified signal serves to produce rudder deflections such that the resultant acceleration vector is maintained within the aircraft's vertical plane of symmetry, i. e., so that the bank angle coincides with the virtual vertical. That is to say, that since there is no lateral component of acceleration the craft can have no side slip nor skid. This third signal also provides a rudder deflection to maintain straight flight under conditions of non-symmetrical thrust, when employed in conjunction with the heading signal described with relation to the roll axis.

It should be observed that in my improved system, the control of the rudder is substantially divorced from the directional gyro or Gyrosyn compass, the rudder being used as a yaw preventer and controlled mainly from the yaw and side slip detecting pendulums 51, 52 and 73. If a turn is made at bank angles above 60 degrees in the prior art systems, the rate of turn is caused to vary at different cardinal points in the turn because the rate of turn is controlled by a conventional gimbaled directional gyroscope or other gimbaled device which controls the rudder. In my system, on the other hand, this error is avoided as well as the complicated rate of turn mechanism heretofore employed in connection with directional gyroscopes, by controlling the rudder during turns mainly from the pendulums 51, 52 and 73. Any rate of change of roll introduced through rate taking network 72 only passes a signal in case a change in heading of the craft is ordered or required and does not affect the rudder position except during the period when the craft's bank angle is being rapidly changed, i. e., when entering or rolling out of a turn.

In summary, directional control is provided by causing the craft to bank in accordance with the departure of the craft's heading from the desired heading, up to a preselected maximum angle of bank. Turn coordination and short period stabilization, against disturbances causing the craft to yaw, are obtained by a combination of three signals applied to control the craft in yaw, preferably through the rudder, viz: a signal proportional for short periods, to rate of yaw and yaw displacement of the craft; a signal proportional to lateral accelerations of the craft; and a signal proportional to the time derivative of the smoothed and limited heading error signal.

Pitch control is obtained from an altitude control in which an altitude signal, responsive to actual altitude, may be generated within the altimeter 81 and compared within the altitude control unit 83 with a second signal generated in a settable altitude seisyn 82. The selsyn 82 has a rotor that is positionable by the knob 84 in accordance with desired altitude, the pointer part of the knob 84 being movable over an appropriately indexed altitude scale. Further details of an acceptable altitude control system may be found in U. S. Patent No. 2,446,546, issued to A. Meston for "Pressure Responsive Controller Devices." Upon the occurrence of an altitude error signal such as would, for example, occur when it is desired to proceed to an altitude differing from the altitude then obtaining, an altitude error signal is generated in altitude control mixer 83 and this error signal is transmitted to the amplifier 85 wherein it is appropriately amplified and then transmitted to an altitude signal smoother and limiter 86 where it is smoothed and limited in the same manner as the heading signal was smoothed and limited for the roll axis. The output from the pitch smoother and limiter is then applied to the summing circuit 87. Also applied to this summing circuit 87 is a pitch angle signal that may be generated in the selsyn 88 that is responsive to craft deviation in pitch relative to the vertical gyro 34. The output from the summing circuit 87, after combining the input from the pitch limiter with the signal from the craft's pitch angle, is then further combined with a pitch trim signal that may be generated in the pitch error corrector 91. These combined signals are then entered into the elevator servo amplifier 92 wherein this combined signal and its first derivative are further amplified and applied to the servo control generator field 93, which, working through the Ward-Leonard motor generator system generally identified at 94, will accordingly cause the elevator servo motor 95 to deflect the elevator in a manner similar to the aileron and rudder control surface mechanisms. A displacement feedback signal may be generated in the signal generating device 96 and fed back to the servo amplifier 92 to produce an elevator displacement proportional to the amplifier input signal.

Figure 5:
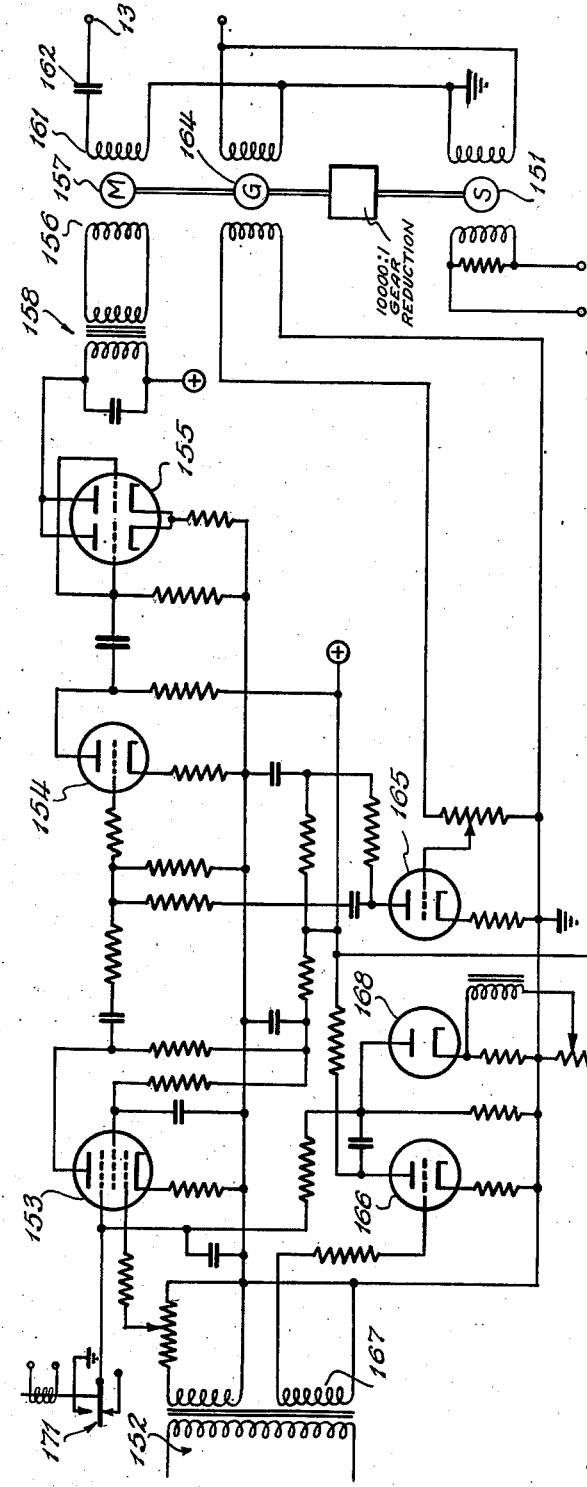
Fig. 5 is a schematic diagram of a pitch error corrector and error corrector cutoff circuits of Fig. 1.

The knob and pointer 97 on the pitch smoother and limiter 86 may be positioned in rotation relative to the dial 98 to control the maximum pitch angle which could be called for from the altitude control 83 in response to an altitude error. Since vertical speed is approximately proportional to pitch angle, this knob 97 may be said to limit craft vertical speed and thereby provide a relative vertical speed control. The pitch error corrector 91 is employed to provide a signal that will trim the craft, that is, adjust its attitude as required for various engine power settings and flight configurations. In order to distinguish between a signal command to change from one altitude to another and a steady state altitude error caused by the pitch angle change required to go from climbing to level flight, an error corrector cut-off 101 is provided. The error corrector cut-off circuit prevents the pitch error corrector 91 from changing the pitch trim attitude when the altitude error from the altitude control 83 is large enough to be limited in the pitch limiter 86, as hereinafter specified more in detail in connection with Fig. 5.

By the apparatus described heretofore, complete automatic control of an aircraft in straight and level flight, climbing and diving, and during coordinated turns has been disclosed. However, the apparatus disclosed lends itself to permit the addition of signals for automatic navigation, approach and landing in a simple manner. For example, a radio beam error signal can be combined directly with the heading error signal to cause the airplane to fly a localizer or radio range automatically. To do this an antenna 102 may be provided to receive radio signals in the very high frequency range for localizer receiver 103. The received signal then may be fed to an approach modulator 104 wherein the D.-C. output of the radio receiver is converted to an A.-C. signal of appropriate frequency, enabling it to be combined with the heading signal. If desired, a cross pointer meter 105 may be connected to the output of the receiver 103 for indicating the position of the aircraft with respect to the radio beam in a manner understood by those skilled in the art of piloting aircraft. A localizer error corrector 106 may be provided to eliminate the effect of cross winds by integrating any residual radio error signal and then transmitting that integrated quantity to the summing circuit 28. In a similar manner, glide path error signals may be substituted for the altitude control error signal received from the altitude control 83. A selector switch 107 may be provided to disengage the altitude control signal from controlling the elevators and place the elevator under the control of a glide path receiver 108 which may receive signals from the antenna 111 and transmit these signals to a glide path modulator 112 wherein the received D.-C. signal is modulated to an appropriate frequency for application to the elevator control circuit hereinbefore described. It is when the glide path circuit is employed that the pitch error corrector becomes particularly desirable for it functions to automatically change the pitch attitude from that required for level flight to that needed to fly down the glide path in the landing configuration.

In other words, pitch control of the craft is obtained by adjusting the pitch attitude of the craft in accordance with either the departure of the craft from a selected altitude, or the departure of the craft from a radio glide path beam. Both rapid and slow-acting corrective signals are provided to permit accurate maintenance of a selected altitude or glide path without errors due to changes in aircraft configuration, gross weight, or engine power output.

Automatic signal index synchronization is provided on all three axes in order to eliminate the use of servo displacement repeat back signals for signal synchronization. This arrangement permits greater flexibility in that several interchangeable servo systems of different types may be used with the common signal system. When the pilot is disengaged, a roll synchronizing amplifier 113 receiving an input signal from the output of the summing circuit 32, in turn has its output applied through the switch 114, interconnecting it to drive the bank limiter so that it produces an output signal equal and opposite to the roll signal from the vertical gyro 34 and its associated selsyn 33. When the pilot is engaged, switch 114 disconnects the roll synchronizing amplifier 113 from the bank limiter 31. The output from the bank limiter then goes to zero at a rate determined by its integrator time constant. This arrangement provides automatic roll trim to the wings-level position of the craft regardless of its attitude when the gyro pilot is engaged.

On the rudder axis the accelerometer signals are made inoperative until the gyro pilot is engaged thereby eliminating any need to balance them out. In the pitch axis, switch 115 may be provided to connect the output of summing circuit 87 to the input of the pitch error corrector 91 when the gyropilot is disengaged. The pitch error corrector 91 then opposes any signal from the vertical gyro 34 and its associated pitch selsyn 88 so that the pitch attitude existing before the gyropilot was engaged will be maintained until changed by a signal from the altitude control 83 or glide path receiver 108 acting through the pitch-limiter 86 and pitch error corrector 91, after the gyropilot is engaged.

Thusly, automatic synchronization is provided to continuously maintain the gyropilot, when not engaged to the control surfaces of the craft, in a state suitable for immediate engagement without further alignment of reference signal indices by the human pilot, and to permit the aircraft to be placed under control of the autopilot when it is not level about its longitudinal axis with the assurance that it will automatically return to the wings-level position.

Figure 3:
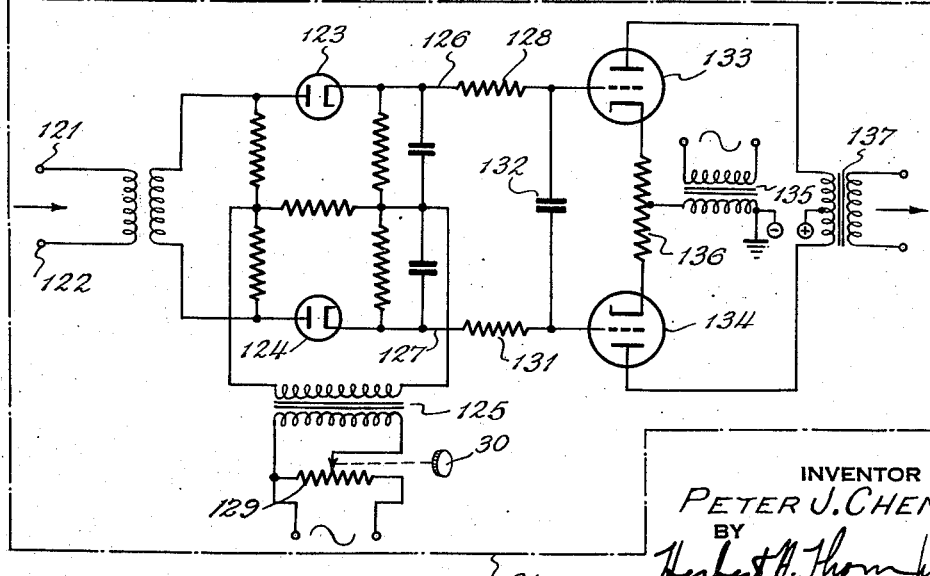
Fig. 3 is a detailed diagram of the bank integrator and limiter of Fig. 1.

Illustrated in Fig. 3 is an acceptable circuit for the bank integrator or smoother and limiter 31 described above in connection with the control of the craft about the aileron axis. It is the function of this circuit to receive error signals from the summing circuit 28, smooth them to remove switching transients and to prevent the output voltage from changing at an excessive rate (thus limiting the maximum rate of roll of the airplane in response to a turn command) and to limit the output voltage to one of any number of selected maximum values, whenever the input voltage exceeds that certain level. Thereby the maximum bank angle that the craft will attain in response to a turn command may be limited. The heading error signal from the summing circuit 28 may be received as an input to the bank limiter 31 at the terminals 121 and 122. This heading error signal is first applied to a conventional half-wave phase sensitive demodulator which employs the diodes 123 and 124. The output of this demodulator is limited to one of several selected maximum levels by adjustment of the potentiometer 129 through knob 30, thereby limiting the reference voltage supplied from the source 13 to the demodulator through the transformer 125. The limited D.-C. output of the demodulator, which appears across the points 126, 127, is integrated by the two resistors 128 and 131 and the condenser 132, and applied to the grids of the balanced modulator tubes 133 and 134. Reference voltage for the modulator is introduced through the transformer 135 whose primary is connected to the source 13 and is applied in parallel to both modulator triodes by connecting it to the midpoint of the resistor 136. The modulator output may be converted to low impedance by the output transformer 137 so that it may be connected in series with other low impedance signals.

Figure 4:
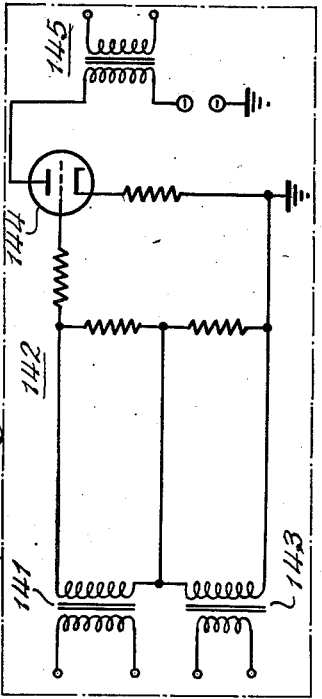
Fig. 4 is a schematic diagram of a summing circuit of Fig. 1.

Fig. 4 illustrates an acceptable summing circuit such as may be employed for the addition of two input voltages, as described in connection with the rudder axis control circuit as the summing circuit 63 or the summing circuit 32. The angular acceleration responsive signal together with its integrals may be entered through the transformer 141 to the resistance network generally identified at 142. A second signal, responsive for example, to the craft's lateral accelerations together with its integrals may be entered through the transformer 143. The grid of a triode 144 may be energized in accordance with the sum of these two input signals and accordingly the output through the transformer 145 will be proportional to the sum of the input circuits.

The desired performance of the pitch error circuit 91 and the error corrector cut-off 101 is such that the output voltage from a linear selsyn 151 (illustrated in Fig. 5) should change at a rate proportional to the steady state error existing in the primary reference signal (altitude or glide path error), up to a certain magnitude.

Altitude or glide path error signals greater than this magnitude are considered to be command signals rather than indications that a change in pitch trim altitude is required, and the output voltage should not change when these large error signals exist. The pitch error corrector circuit takes altitude or glide path error signals at a high level from the amplifier 85, preceding the pitch limiter, and this signal is amplified in the input transformer 152 and applied to the control grid of a pentode type amplifier 153. The output of this stage is mixed with an amplified speed voltage and applied to the grid of a high-mu triode 154 for further amplification. The output of this triode is applied to a power amplifier consisting of two triodes 155 in parallel. The output of this stage is in turn coupled to the control phase winding 156 of a two phase A.-C. servo motor 157 by means of an output transformer 158. Winding 161 of the servo motor is excited through a capacitor 162 from a suitable voltage supply 13. The servo motor 157 drives the linear selsyn 151 which yields the desired output voltage through the winding 163. The voltage proportional to servo motor speed is provided by an A.-C. speed responsive generator 164 that is coupled to the servo motor 157. This voltage is amplified in a triode 165 and mixed with the error input signal as described above to maintain servo motor speed proportional to input error signal. A second error signal amplifier consisting of a triode 166 is fed from another secondary winding 167 of the input transformer and amplifies the altitude or glide path error signal and applies it to a diode rectifier 168. When the A.-C. error signal applied across the diode 168 is large enough to overcome the positive D.-C. bias that is applied, rectification takes place and a negative D.-C. potential appears at the diode plate. This negative potential, after being suitably filtered, is applied as bias to the suppressor grid of the pentode 153. When the grid is biased sufficiently negative, the pentode is cut off and no error signal is fed to the following amplifier 154. In the absence of error signal input, the error-corrector servo motor stops. This suppressor grid may be grounded by a contact on the relay 171 to prevent the cut-off circuit from functioning.

Figure 6:
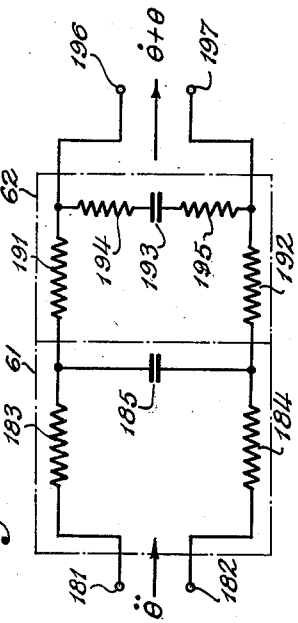
Fig. 6 is a schematic diagram of a double integration circuit.

Fig. 6 illustrates an integrator circuit such as may be employed in the angular acceleration integrator circuit 61 with its associated second stage of integration 62. The acceleration responsive signal $\ddot{\theta}$ (due to yaw) may be entered at the terminals 181 and 182 and a first stage of integration takes place in the resistance-capacitance (R. C.) network including the resistors 183, 184 and condenser 185.

The output from this resistance-capacitance network is further integrated in the R. C. circuit including resistances 191, 192 and the condenser 193 and also a portion of the first integral is added to the second integral through the resistors 194 and 195. The output across the terminals 196 and 197 then will become a combination of a portion of the first integral $\dot{\theta}$ plus a second integral $\theta$ of the original acceleration input term. As previously stated, both signals decay with time, that is, are wiped out after an interval as is characteristic of condenser networks and this is desirable since its function is only to prevent yaw and side slip without interfering with command turns and changes of course.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for a dirigible craft having a rudder, displaceable means responsive only to craft angular acceleration in yaw and independent of curvilinear flight, signal producing means responsive to displacement of said means and variable with the amount and sign thereof, first integrating means for producing a first time integral of said signal, second integrating means for producing a second time integral of said signal, a summing device for combining said first and second integrals and having an output in accordance therewith, and servo means controlled by said output to control the rudder.

2. In an automatic pilot for controlling the rudder of a dirigible craft, yaw sensitive means producing a signal proportional to the angular acceleration in yaw of the craft independently of turn, means producing a displacement proportional to craft lateral acceleration or side slip, signal producing means having an output proportional to said displacement, time integrating means for both of said produced signals, and means applying said integrated signals to control said rudder.

3. In an automatic pilot for dirigible craft having yaw control means, angular acceleration responsive means having a signal output, a first integrating means for said signal, lateral acceleration responsive means having a signal output, a second integrating means for said last-mentioned signal, a summing means for receiving and combining said signals and their integrals, and circuit means for applying said combination to control the yaw control means.

4. In the combination set forth in claim 3, said first integrating means including means for obtaining the first and higher integrals of the input signal.

5. In an automatic pilot for dirigible craft having yaw control means, including means for producing a signal responsive to angular acceleration of the craft, heading reference means having means for generating a signal upon departure of the craft from a preselected heading, means limiting the rate of change of said signal, means selectively limiting the magnitude of said heading signal, means producing a time derivative of said limited signal, and means for opposing said first signal by said derivative signal to prevent interference of the first signal with command turns.

6. In an automatic pilot for dirigible craft having yaw control means, including means for producing a signal responsive to angular acceleration of the craft, heading reference means having a signal output proportional to disagreement of craft heading from preselected heading, command means for causing a course change through said heading reference means, means limiting the magnitude of said signal, means for receiving said limited signal and having an output proportional to the time derivative thereof, and means for opposing said first signal by said derivative signal to prevent interference of the first signal with command turns.

7. In an automatic pilot for dirigible craft having yaw control means, including means for producing a signal responsive to angular acceleration of the craft, craft heading reference means having signal generating means responsive to deviation of craft heading from preselected heading, command means for causing a course change through said heading reference means, limiting means for said signal, circuit means for obtaining a signal proportional to the derivative of said limited signal, and means for opposing said first signal by said derivative signal to prevent interference of the first signal with command turns.

8. In an automatic pilot for dirigible craft, craft heading reference means having signal generating means responsive to deviation of craft heading from preselected heading, limiting means for said signal, means for differentiating said signal for producing a signal proportional to the derivative of said limited signal, and means applying said derivative signal to the rudder control of the craft.

9. In an automatic pilot for dirigible craft, craft heading reference means for producing a signal proportional to craft departures from preselected heading, a bank smoother and limiter means for receiving said signal, circuit means for obtaining the derivative of said smoothed and limited signal, means including angular acceleration responsive devices for producing a signal proportional to craft angular acceleration in yaw, integrating means for said last signal, a summing circuit for combining all of said signals, and means connecting said combined signals to control the craft in yaw.

10. The combination set forth in claim 9 further including lateral acceleration responsive means having a signal output, integrating means for said lateral acceleration signal, and circuit means connecting said integrated acceleration signal to said combined signals.

11. The combination set forth in claim 9 further including circuit means connecting said integrated and limited heading signal to control the craft in roll.

12. In an automatic pilot for dirigible craft having roll control means, craft heading reference means for producing a signal proportional to craft departures from preselected heading, magnitude limiting means for modifying said signal, craft roll responsive means having a signal output proportional to craft roll, a summing circuit for combining said modified and roll signals, synchronizing means operative upon disconnection of said heading reference signal from the input to said limiting means for applying said combined signals as an input to said limiting means whereby the combination of said signals at said summing circuit is maintained equal to zero during the period of such disconnection.

13. In an automatic pilot for dirigible craft having pitch control surfaces, craft altitude reference means including means for producing a signal upon deviation of the craft from preselected altitude, circuit means for smoothing and limiting said altitude signal, signal producing means responsive to deviation of craft attitude from a predetermined reference, a summing circuit for combining said signals, and means applying said combined signal to control said craft control surface.

14. In an automatic pilot for dirigible craft having pitch control surfaces, craft altitude reference means having a signal output, settable means for altering said signal, smoothing and limiting means for said signal producing a first control signal, pitch error corrector means for receiving said first control signal and having a second control output signal to correct craft trim, and a summing circuit for said control signals.

15. In the combination of claim 14, an error corrector cutoff circuit for preventing said error corrector from altering craft trim when the craft altitude error signal is of sufficient size to be limited in said integrating and limiting means.

16. An automatic pilot for aircraft having course governing mechanism normally controlling the course by actuating the ailerons of the craft, additional means for controlling the rudder of the craft independently of said mechanism, including means producing a signal proportional only to the angular acceleration in yaw of the craft, means producing a signal proportional to side slip or lateral acceleration of the craft, time integrating means for both of said produced signals, and means applying said integrated signals to control said rudder.

17. In an automatic pilot for aircraft, a heading maintaining device, an attitude maintaining device, means for commanding a predetermined change in the heading through said device, an aileron servomotor controlled from both of said command means and attitude maintaining device to set up a bank and consequent rate of turn proportional to the amount of course change demanded, a rudder servomotor, signal generating means having an output proportional to craft's yaw independent of curved flight, integrating means for receiving said signal and having an output proportional to the integral thereof with respect to time, and means connected to apply said integrated signal to control said rudder servo.

18. In an automatic pilot for dirigible craft having automatic means for controlling the roll attitude of the craft, craft heading reference means for producing a signal proportional to craft deviation from a set heading, means for modifying said signal to cause a turn at a commanded rate, smoothing and magnitude limiting means for said signal, and means for applying said signal as smoothed and limited to control said attitude of the craft to cause a bank proportional within limits to heading change or deviation, and thereby cause a turn of the craft toward its said course at a rate proportional to the commanded change of heading.

19. In an automatic pilot for dirigible craft having a gyro vertical, signal means operated thereby for normally maintaining level flight in elevation, craft altitude reference means for producing a signal upon departure of the craft from a preset altitude, means for mixing said signals to maintain the craft at the predetermined altitudes, smoothing and magnitude limiting means for said mixed signals and an elevator servomotor controlled by the output of said last named means.

20. In an automatic pilot for aircraft, a heading maintaining device, an attitude maintaining device, an aileron servomotor controlled primarily from both of said devices, whereby the desired course is maintained through banking the craft at an angle proportional to course deviation, a rudder servomotor, means for producing a signal proportional to the angular acceleration of the craft about its own yaw axis, means for obtaining a first and second time integral of said signal to produce new signals proportional to craft angular velocity and displacement in yaw, and means actuated thereby for controlling said rudder servomotor.

21. An automatic pilot as claimed in claim 20 also having a side slip detector, and signal means actuated thereby for also controlling said rudder servomotor.

22. In an automatic pilot for aircraft, a heading maintaining signal producing means, an attitude maintaining signal producing means, an aileron servomotor controlled primarily from both of said signals, whereby the desired course is maintained through banking the craft at an angle proportional to course deviation, a rudder servomotor, a yaw responsive device, signal means actuated thereby for controlling said rudder servomotor, and derivative means connected to said first signal means for also actuating said rudder servomotor to prevent rudder interference with the initiation of command turns.

23. In an automatic pilot for aircraft, a course maintaining and course changing signal producing means, an attitude maintaining signal producing means, an aileron servomotor controlled primarily from both of said signals, whereby the desired course is maintained or changed through banking the craft at an angle proportional to course deviation, a rudder servomotor, a yaw device responsive only to short period yaw deviations regardless of bank, signal means actuated thereby for controlling said rudder servomotor, and follow-back signal means actuated by each servomotor for proportioning aileron and rudder displacement to their respective signal strengths.

24. In an automatic pilot for dirigible craft having a gyro vertical, signal means operated thereby for normally maintaining level flight, craft altitude reference means for producing a signal upon departure of the craft from a preset altitude, radio glide path reference means for producing a signal upon departure of the craft from a radio glide path, means for mixing said signals to maintain the craft in the selected glide path, smoothing and magnitude limiting means for said mixed signals and an elevator servomotor controlled by the output of said last named means.

25. In an automatic pilot for aircraft, a course maintaining and changing device, an attitude maintaining device, an aileron servomotor controlled from both of said devices to set up a bank and consequent rate of turn proportional to any course change commanded, a rudder servomotor, signal generating means having an output proportional to craft's yaw independent of curved flight, integrating means for receiving said signal and having a decaying output proportional to the integral thereof with respect to time, and means connected to apply said integrated signal to control said rudder servo.

26. In an automatic pilot for aircraft as claimed in claim 25, having means for deriving a decaying signal from said course changing device proportional to the rate of change thereof only during transition from straight to curved flight and vice versa, whereby said signal disappears during uniformly curved or straight flight, and means for applying said last-named signal to oppose said integrated yaw signal during the initiation of command turns.

27. In an automatic pilot for dirigible craft having rudder and aileron servomotors and automatic means for controlling the roll attitude of the craft through said aileron servomotor, craft heading reference means for producing a signal proportional to craft deviation from a set heading, means for modifying said signal to cause a turn at a commanded rate, smoothing and magnitude limiting means for said signal, and means for applying said signal as smoothed and limited to control the aileron servomotor and thereby the roll attitude of the craft thereby causing a bank which is proportional within limits to heading change or deviation, and thereby causing a turn of the craft toward its desired course at a rate proportional to the commanded change of heading, and means responsive to side slip for readjusting the rudder servomotor to prevent side slip.

28. In an automatic pilot for a dirigible craft having a rudder, a pair of spaced pendulums pivoted thereon about a fore-and-aft axis and situated at different distances from the vertical center of the craft, cross connected signal generators connected to the pendulums, whereby a resultant signal is only produced upon opposite movement of the pendulums, a first integrating means for producing therefrom a decaying signal representing rate of turn, a second integrating means for producing a decaying signal representing heading change, a summing device for combining said integrals having an output and servo means controlled by said output for controlling the rudder.

References Cited in the file of this patent

UNITED STATES PATENTS

| | | |
|---|---|---|
| 1,966,170 | Greene | July 10, 1934 |
| 2,270,875 | Hanson et al. | Jan. 27, 1942 |
| 2,346,838 | Haight | Apr. 18, 1944 |
| 2,351,977 | Kronenberger et al. | June 20, 1944 |
| 2,401,421 | Hahn | June 4, 1946 |
| 2,415,819 | Halpert et al. | Feb. 18, 1947 |
| 2,429,642 | Newton | Oct. 28, 1947 |
| 2,432,036 | Noxon | Dec. 2, 1947 |
| 2,474,618 | Divoll | June 28, 1949 |
| 2,487,793 | Esval et al. | Nov. 15, 1949 |
| 2,488,286 | Glenny | Nov. 15, 1949 |
| 2,496,809 | Moseley | Feb. 7, 1950 |
| 2,512,902 | Rossire | June 27, 1950 |
| 2,553,560 | Esval | May 22, 1951 |
| 2,553,597 | Marioni | May 22, 1951 |
| 2,592,173 | Noxon et al. | Apr. 8, 1952 |
| 2,602,611 | Glenny | July 8, 1952 |